United States Patent [19]

Iwasaki

[11] Patent Number: 5,317,444

[45] Date of Patent: May 31, 1994

[54] LIGHT SCANNING APPARATUS

[75] Inventor: Takeo Iwasaki, Nagoya, Japan

[73] Assignee: Brother Kogyo Kabushiki Kaisha, Nagoya, Japan

[21] Appl. No.: 982,900

[22] Filed: Nov. 30, 1992

[30] Foreign Application Priority Data

Dec. 2, 1991 [JP] Japan .................................. 3-317962

[51] Int. Cl.⁵ ............................................ G02B 26/08
[52] U.S. Cl. ..................................... 359/214; 359/215; 359/218; 359/221; 346/108
[58] Field of Search ................ 359/212, 213, 214, 215, 359/220, 221, 216, 217, 218; 346/108, 160

[56] References Cited

U.S. PATENT DOCUMENTS

| | | | |
|---|---|---|---|
| 3,719,780 | 3/1973 | Gazard et al. | 359/221 |
| 4,274,101 | 6/1981 | Kataoka et al. | 346/108 |
| 4,731,623 | 3/1988 | Oda et al. | 346/160 |
| 4,915,465 | 4/1990 | Sugiura | 359/216 |
| 4,982,205 | 1/1991 | Hasegawa | 359/218 |

Primary Examiner—Loha Ben
Attorney, Agent, or Firm—Oliff & Berridge

[57] ABSTRACT

An optical scanning apparatus of the present invention is for optically scanning a medium. In the optical scanning apparatus, a light source receives image information and emits light beam modulated in accordance with the image information. A single optically imaging system is positioned in a single location for receiving the light beam from the light source and for focusing the light beam to be focused on the medium. A reflective mirror formed with a single reflective surface is provided for reflecting the light beam from the optically imaging system to direct the light beam to the medium. The reflective mirror is rotated by a motor at a fixed speed to allow the reflective surface to scan the light beam on the medium in a scanning sweep. Surfaces other than the reflective surface of the reflective mirror is prevented from directing the light beam to be focused on the medium.

24 Claims, 6 Drawing Sheets

LIGHT SCANNING APPARATUS

BACKGROUND OF THE INVENTION

1. Field of the Invention

The present invention relates to an optical scanning apparatus used for an electrophotographic type image recording apparatus.

2. Description of the Related Art

There has been known an electrophotographic type image recording apparatus for receiving image information from a computer and forming an image on an image receiving medium in accordance with the image information. The image recording apparatus is equipped with an optical scanner which receives the image information from the computer and modulates and deflects laser beam emitted from a laser source in accordance with the image information.

Figure 1:
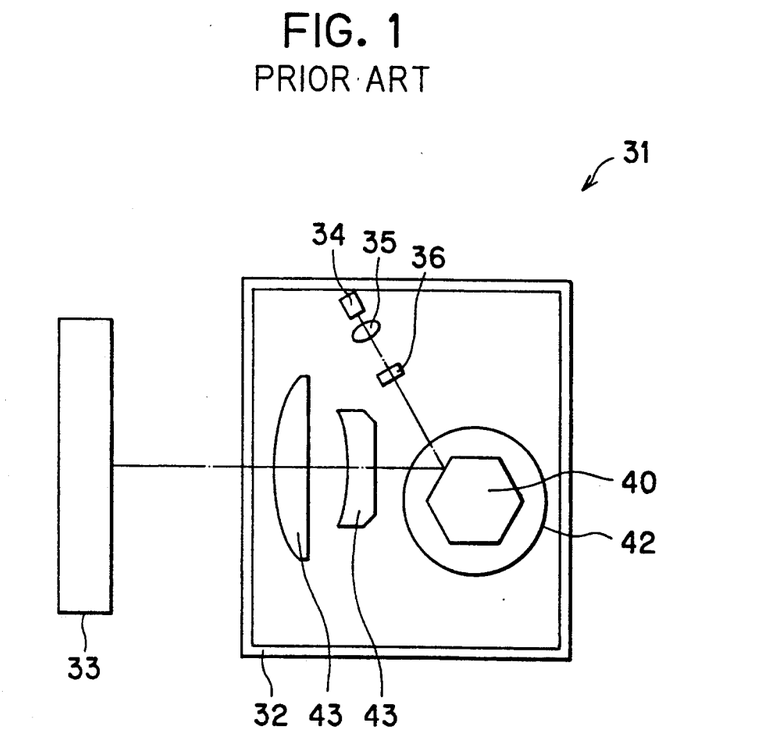
FIG. 1 is a plan view showing a conventional optical scanner which is positioned to confront a cylindrically-shaped photosensitive drum and which optically scans the photosensitive drum in a raster pattern.

FIG. 1 shows a conventional optical scanner 31 employed in the electrophotographic type image recording apparatus. The optical scanner 31 receives the image information from the computer and optically scans a cylindrically-shaped photosensitive drum 33 in raster pattern to form a latent image thereon. As shown in FIG. 1, the optical scanner 31 is positioned to confront the photosensitive drum 33. All the components of the optical scanner 31 are encased in a casing 32. In the casing is installed a semiconductor laser 34 which faces a polygonal mirror 40. The polygonal mirror 40 is axially fixed to a rotating shaft of a constant-speed rotating motor 42. Installed between and justified with the semiconductor laser 34 and the polygonal mirror 40 are a collimating lens 35 and a cylindrical lens 36. Installed between the polygonal mirror 40 and the photosensitive drum 33 are a series of imaging lenses 43 including an fθ lens.

The laser 34 is electrically connected to a computer device and receives image signals from the computer. The laser 34 emits laser beam modulated in accordance with the image signals. The laser beam emitted from the laser 34 passes through the collimating lens 35 where it is converted into a parallel beam. The parallel beam then passes through the cylindrical lens 36 where it is focused to strike a surface of the polygon mirror 40 in an elliptic beam spot. Since the polygonal mirror 40 is rotated with a constant speed by the motor 42, the laser beam reflects off the polygon mirror 40 to be deflected therefrom at a constant angular velocity. The laser beam then passes through the imaging lenses 43 and strikes a peripheral surface of the photosensitive drum 33 where an electrostatic latent image is produced. The latent image is then developed through a well-known electrophotographic process and is transferred to be fixed on a hard copy medium such as a paper.

The above-described conventional optical scanner has a problem, however, in that the polygonal mirror 40 should be equiangular, which requires high-precision production, to prevent irregularities in spacings between scanning lines that will possibly appear if surfaces thereof are at varying angles with respect to the axis of the polygonal mirror 40.

Inclusion of the cylindrical lens 36 and the imaging lenses 43 is a well-known technique for reducing such irregularities. However, this technique creates additional problems wherein the number of parts and the complexity of the apparatus increase. It is noted that the imaging lenses 43 include a plurality of fθ lenses each of which has a complex shape. The increase in the number of the parts further requires an intricate positioning operation of the parts so that all the parts may be axially aligned with respect to an optical axis of the laser beam. More specifically to say, the semiconductor laser and the collimating lens should be positioned relative to each other so that the laser beam from the semiconductor laser may be reliably converted into the parallel beam. The cylindrical lens and the imaging lenses should be positioned relative to the polygon mirror so that the laser beam may be focused on the polygon mirror and may be focused on the photosensitive drum in a beam spot having a desired spot shape.

Furthermore, the polygon mirror should be symmetrical with respect to its axis so that it may be mounted on the motor rotating shaft in a balanced manner, to thereby prevent variations in the rotation speed of the motor. Accordingly, the polygon mirror should be produced with high accuracy.

High precision is also required for attaching the polygonal mirror 40 to the motor 42. If the two are not precisely axially aligned, the large mass and subsequent inertia of the polygonal mirror 40 cause large variations in rotation speed of the motor 43.

As described above, each of the parts employed in the conventional optical scanner has a complex shape. The number of the parts employed in the conventional optical scanner is large, and therefore positioning operations for the parts becomes intricate. Accordingly, the conventional optical scanner is expensive.

SUMMARY OF THE INVENTION

It is therefore, an object of the present invention to overcome the above-described drawbacks, and to provide an optical scanning apparatus which is equipped with parts having a simple structure.

Another object of the invention is to provide an optical scanning apparatus having the parts with the number thereof being reduced.

A further object of the invention is to provide an optical scanning apparatus having the parts which are necessarily adjusted to be accurately positioned.

A still another object of the invention is to provide an optical scanning apparatus which can be produced with low cost.

According to the present invention, in order to achieve the above and other objects, an optical scanning apparatus for optically scanning a medium comprises: a light source for receiving image information and for emitting light beam modulated in accordance with the image information; reflecting means including a first part defining a single reflective surface for reflecting the light beam emitted from the light source to direct the light beam to the medium; and rotating means for rotating the single reflective surface of the reflecting means to allow the single reflective surface to scan the light beam on the medium in a scanning sweep.

The reflecting means preferably includes a plate-shaped reflective mirror having a single, flat, reflective surface for reflecting the light beam to direct it to the medium.

The optical scanning apparatus may further include imaging means for receiving the light beam emitted from the light source and for converting the light beam into a focused light beam to be focused on the medium, the imaging means being positioned in a single location between the light source and the reflecting means along an optical path of the light beam. The single reflective surface of the reflecting means receives the focused light beam from the imaging means and directs the focused light beam to the medium.

The reflecting means further has a second part, and the optical scanning apparatus may further comprise preventing means for preventing the second part of the reflecting means from directing the light beam to be focused on the medium. The preventing means includes means for allowing the second part of the reflecting means to absorb or scatter the light beam.

The rotating means may include a rotating shaft which rotates around an axis thereof, and the optical scanning apparatus may further comprise fixing means for fixing the reflecting means to the rotating shaft in such a state that the single reflective surface may extend in a direction which forms an angle with respect to the rotating shaft, the angle having a value falling within a desired range.

The fixing means is preferably formed with first and second contacting surfaces for contacting the single reflective surface and the rotating shaft, respectively, in the case where the fixing means fixes the reflecting means to the rotating shaft, the first and second contacting surfaces extend in directions which form therebetween the angle which has the value within the desired range.

The reflecting means may include a reflective mirror having the single reflective surface, and the fixing means may include a holder for fixedly holding therein both the reflective mirror and the rotating shaft of the rotating means, the holder having a mirror supporting wall defining the first contacting surface and pressing means for pressing the mirror against the mirror supporting wall so that the single reflective surface of the mirror may be in contact with the first contacting surface, the mirror supporting wall having at least one edge for defining an exposing area for exposing at least a part of the single reflective surface of the reflective mirror, the holder further having an inner peripheral wall defining the second contacting surface and defining a cylindrical bore for receiving the rotating shaft inserted therein so that the rotating shaft may be in contact with the second contacting surface.

The holder preferably has a first area for exposing at least a part of the single reflective surface of the reflecting means and a second area, and the optical scanning apparatus may further comprise prevention means for preventing the second area of the holder from directing the light beam to be focused on the medium. The prevention means includes means for allowing the second area of the holding member to absorb or scatter the light beam.

In the optical scanning apparatus, a length W (mm) of a scan locus on the medium effectively scanned by the light beam reflected from the single reflective surface of the reflecting means in one scanning sweep and a smallest length L (mm) of an optical path along which the light beam travels from the single reflective surface of the reflecting means to the medium preferably satisfies the following relationship:

$$1.0 \leq \cos^{-2}\{\tan^{-1}(W/2L)\} \leq 1.1.$$

The optical scanning apparatus may further comprise an optical path elongating means for receiving the light beam reflected from the single reflective surface of the reflecting means and for directing the light beam to the medium, the optical path elongating means elongating a smallest length L (mm) of an optical path along which the light beam travels from the single reflective surface to the medium while maintaining a direct distance between the single reflective surface and the medium. The optical path elongating means includes at least one reflective mirror.

According to another aspect of the present invention, an optical scanning apparatus for optically scanning a medium comprises: a light source for receiving image information and for emitting light beam modulated in accordance with the image information; reflecting means formed with a single reflective surface for reflecting the light beam from the light source to direct the light beam to the medium; an optically imaging system positioned in a single location between the light source and the reflecting means along an optical path of the light beam, the optically imaging system receiving the light beam from the light source, converting the light beam into a focused beam to be focused on the medium, and directing the focused light beam to the reflecting means; rotating means for rotating the reflecting means to allow the reflective surface to scan the light beam on the medium in a scanning sweep; and preventing means for preventing surfaces other than the reflective surface of the reflecting means from directing the light beam to be focused on the medium.

In the optical scanning apparatus of the present invention as constructed above, the light beam emitted from the light source is focused by the optically imaging system and is deflected by the reflecting means which is rotated by the rotating means, so that the light beam is scanned in a scanning sweep. Since there is provided no focusing means between the reflecting means and the medium, the light beam deflected by the reflecting means is no longer converted into a further focused beam and passes through the optical path elongating means before being irradiated on the medium.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Referring to the accompanying drawings, a preferred embodiment of the invention will be described.

Figure 2A:
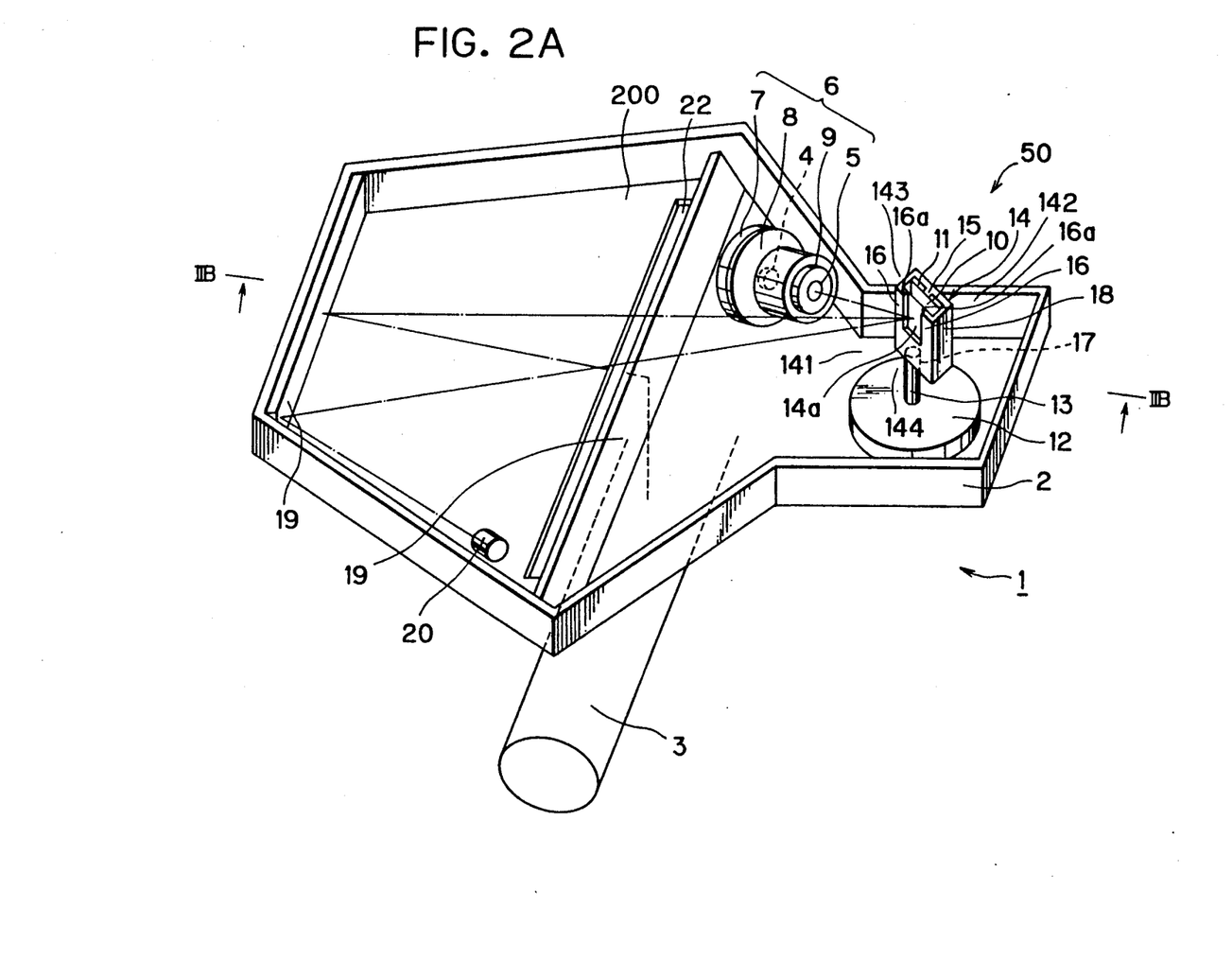
FIG. 2A is a perspective view showing an optical scanner according to an embodiment of the present invention.
Figure 2B:
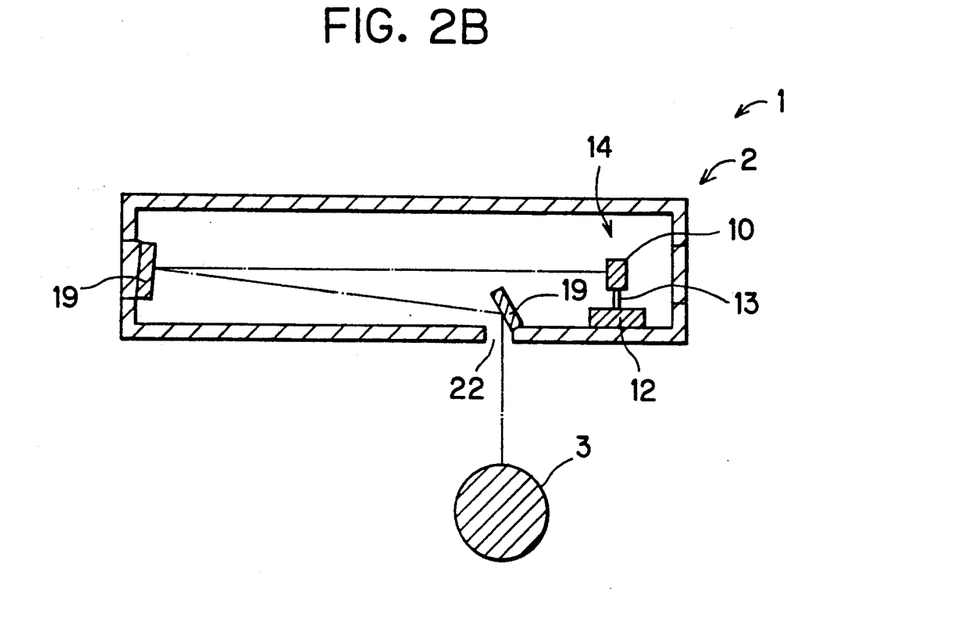
FIG. 2B is a cross-sectional view showing the optical scanner of FIG. 2A taken along a line IIB—IIB.

FIG. 2A is a perspective diagram showing an optical scanner 1 according to the present invention, and FIG. 2B is a cross-sectional view of the optical scanner taken along a line IIB—IIB in FIG. 2A. All the components of the optical scanner 1 are encased in a casing 2 which is formed with a slit 22 at a position confronting a cylindrically-shaped photosensitive drum 3 which the optical scanner 1 scans in a raster pattern. The casing 2 is made of fiber glass containing resin or similar material sturdy enough to precisely maintain the positions of the components, thereby minimizing distortions from possible vibration.

Figure 3:
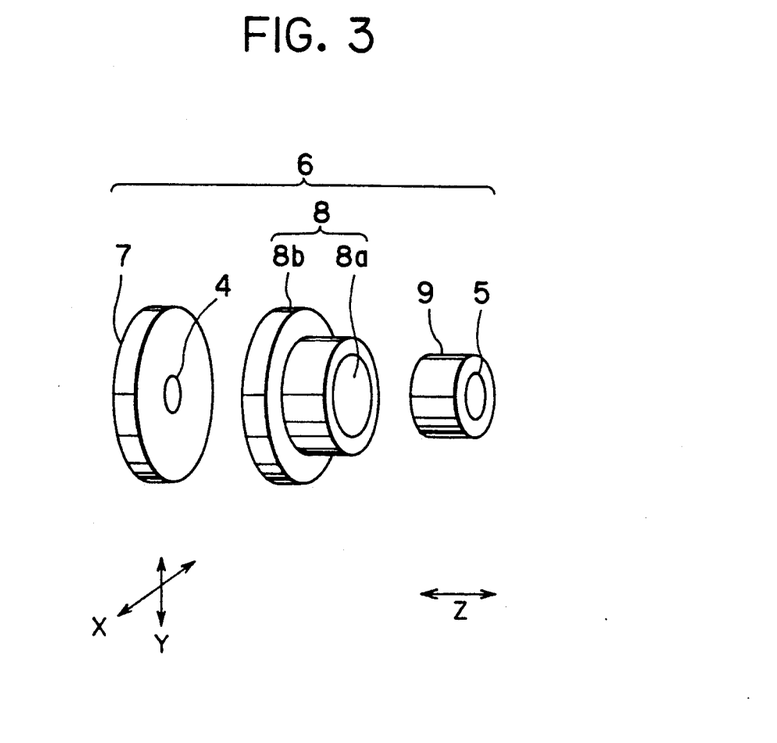
FIG. 3 is a perspective diagram showing a laser unit employed within the optical scanner of the embodiment, where the laser unit is disassembled into respective components for clarity and simplicity, FIGS. 4A and 4B respectively show side and bottom views of a holder employed within the optical scanner to which to be fitted are a mirror and a rotating shaft of a motor.

Installed in the casing 2 is a laser unit 6 for accurately positioning an imaging lens 5 and a laser source 4 relative to each other. The laser unit 6 is formed by a combination of components formed of aluminum or other metal. FIG. 3 is a perspective diagram schematically showing the components of the laser unit 6 and their positional relationship. It is noted, however, that FIG. 3 shows the state that the laser unit 6 is disassembled into the components thereof. As shown in FIG. 3, this laser unit 6 has a tubular barrel support 8 which is fixedly mounted in the casing 2. The barrel support 8 has a cylindrically-shaped inner through-hole 8a which extends in a Z direction and which slidably receives therein a cylindrically-shaped imaging lens barrel 9. At the axial center of the cylindrical imaging lens barrel 9 is fixed an imaging lens 5. Accordingly, the imaging lens 5 is slidably movable in the Z-axis direction. The barrel support 8 is further formed with a flange 8b on which is slidably mounted a disc-shaped light source base 7 in X- and Y-axis directions which extend perpendicularly to the Z-axis direction. At the axial center of the light source base 7 is fixed a light source 4. Accordingly, the light source 4 is slidably movable in the X- and Y-axis directions. According to the above-described structure of the laser unit 6, the imaging lens barrel 9 is moved to set a distance between the laser source 4 and the imaging lens 5 to a desired value, and the light source base 7 is moved to axially align the laser source 4 with respect to the imaging lens 5. Thus, with the laser unit 6, it is readily possible to position the laser source 4 with respect to the imaging lens 5 with high accuracy. The laser unit 6 is provided with engaging means (not shown in the drawing) for fixedly securing the imaging lens barrel 9 and the laser source base 7 with respect to the base support 8. Thus, the laser source 4 and the imaging lens 5 are fixedly mounted in the casing 1 with the positional relationship therebetween being accurately adjusted to be fixedly maintained.

The light source 4 includes a semiconductor laser source which is electrically connected to an external electronic device such as a computer (not shown in the drawing) and receives therefrom image signals. The laser source emits a laser beam with its intensity being modulated in accordance with the image signals.

The imaging lens 5 includes a single lens formed of plastic or other materials. The imaging lens barrel 9 is positioned so as to set the distance between the laser source 4 and the imaging lens 5 to such a value as required for allowing the imaging lens 5 to focus the laser beam from the laser source 4 on the peripheral surface of the photosensitive drum 3 to form thereon a beam spot having a desired spot diameter. It is noted that the imaging lens 5 may be formed from a variety of other materials and may be composed of several separate lenses combined to achieve a specific magnification power. However, it is preferable to use, as the lens 5, a single plastic lens which greatly simplifies the construction of the optical scanner 1.

In the case where the single lens 5 focuses the laser beam from the light source 4 on the surface of the photosensitive drum to form a beam spot thereon, the smallest beam spot diameter 2ω can be determined by the following equation:

$$2\omega = f\lambda / A \tag{1}$$

where f = a length of an optical path along which the laser beam proceeds from the imaging lens 5 to the photosensitive drum 3, λ = a wavelength of the laser beam, and A = an effective aperture of the imaging lens 5.

As apparent from the equation (1), in the case where f and λ have fixed values, a smaller beam spot diameter can be obtained by increasing the value of A. In order to form on the photosensitive drum 3 a beam spot of a desired spot diameter, therefore, it is necessary to select the effective aperture A of the lens 5 to such a value as satisfies the above equation. For example, in the case where it is desired to form the beam spot having the smallest beam spot diameter 2ω of 100 [μm], it is necessary to use such a lens 5 as has the effective aperture of a value of 3.9 [mm], if the optical path f has a value of 500 [mm] and the wavelength λ has a value of 780 [nm], As described above, the laser unit 6 serves to adjust and maintain the positional relationship between the light source 4 and the imaging lens 5. More specifically to say, the laser unit 6 serves to accurately align an optical axis of the imaging lens 5 with respect to an optical axis of the laser beam emitted from the laser source 4. In addition, the laser unit 6 serves to adjust the distance between the imaging lens 5 and the laser source 4 to such a value as desired to focus the laser beam on the surface of the photosensitive drum 3 at appropriate position and with the appropriate beam spot diameter. Accordingly, the laser unit 6 serves to emit a focused laser beam which is axially aligned with the imaging lens 5. The laser unit 6 also functions to release heat from the laser source 4.

In the present invention, as apparent from the above, optical components for adjusting light beam to be projected on the photosensitive drum 3 are all located in the same place. In other words, the optical components for adjusting the light beam to be projected on the photosensitive drum 3 are totally mounted in the single laser unit 6 to be assembled into a single unit. This arrangement is simpler than that of the above-described conventional optical scanner which has optical components (the lenses 35, 36 and 43) in more locations.

As shown in FIG. 2A, in the optical path of the laser beam focused by the imaging lens 5 is installed a mirror assembly 50. The mirror assembly 50 includes a reflective mirror 10 formed with a single reflective surface 11, a box-shaped holder 14 for installing therein the mirror 10, and a constant-speed rotating motor 12 which has a rotational shaft 13 fixedly attached to the holder 14.

The reflective mirror 10 is formed with the single reflective surface 11 through a well-known technique such as vapor deposition for depositing aluminum on a single surface of a plate-shaped float glass base. For example, the mirror 10 has a plate shape having a surface of about 10 mm square and having 5 mm thick. The reflective surface 11 has a surface precision of about $\lambda/4$ so as not to distort the laser beam received thereon.

Figure 4A:
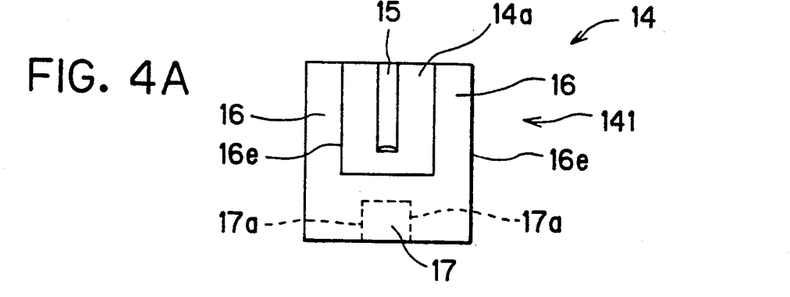
Figure 4B:
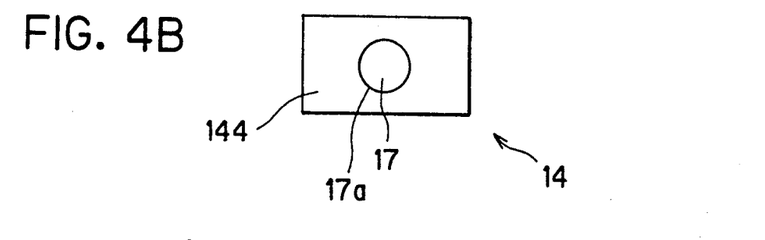

FIGS. 4A and 4B respectively show side and bottom views of the holder 14. As shown in FIGS. 2A and 4A and 4B, the holder 14 has a front side 141, a rear side 142, a top side 143, and a bottom side 144. The top side 143 is entirely opened for inserting the mirror 10 into the holder 14, and the front side 141 is partly formed with an opening (which is referred to as a "front opening 14a", hereinafter) for exposing a part of the reflective surface 11 held in the holder 14. More specifically to say, the holder 14 has two support walls 16 at its front side 141. The two support walls 16 are formed with two edges 16e, respectively, which define therebetween the front opening 14a. In the rear side 142 is formed an inwardly protruding ridge 15 that runs between the top side 143 and the bottom side 144. The ridge 15 is provided for pressing the reflective mirror 10 against inner surfaces 16a of the support walls 16 so that the reflective mirror 10 is fixedly mounted in the holder 14. The ridge 15 can be formed from a portion of the holder 14 which may be deformed to develop elastic force for pressing the reflective mirror 10 against the inner surfaces 16a of the support walls 16. Or otherwise, the ridge 15 can be formed from a separate resilient member such as a leaf spring attached to an inner wall of the holder 14 at its rear side 142.

On the outer surface of the holder 14 is a light-absorbing or light-scattering surface 18. The light-absorbing or light-scattering surface 18 can be a portion of the holder 14 or a material applied to the holder 14. For example, in the case where the holder 14 is formed of a light-absorbing material such as black plastic, the light-absorbing or light-scattering surface 18 would be formed by the outer surface of the holder 14 itself. In the case where the holder 14 is made of aluminum or other metal, on the other hand, the light-absorbing or light-scattering surface 18 could be formed by roughening the surface of the holder 14 to scatter light or by coating the surface with a light-absorbing material.

The light-absorbing or light-scattering surface 18 serves to prevent light from reflecting at the components of the mirror assembly 50 other than the reflective surface 11. Without this light-absorbing or light-scattering surface 18, when the reflective surface 11 faces away from the incoming laser beam, the laser beam would pass through the glass base of the mirror 10 and reflect at the under surface of the reflective surface 11. A laser beam reflected in this way could strike the photosensitive drum 3 and form unwanted images. Such unwanted images could also appear when the laser beam reflects at any highly-reflective flat metal or glass surface of the mirror assembly 50 other than the reflective surface 11. In the optical scanner according to the present invention, however, since the light-absorbing or light-scattering surface 18 is provided on any surface of the mirror assembly 10 other than the reflective surface 11, when the laser beam strikes the any surface of the mirror assembly 50 other than the reflective surface 11, the light-absorbing or light-scattering surface 18 will either absorb or scatter the laser beam, sufficiently reducing its intensity to prevent formation of unwanted images on the photosensitive drum 3.

The holder 14 is attached to the rotational shaft 13 of the motor 12. As apparent from FIGS. 4A and 4B, the holder 14 is formed, at the center portion of its bottom side 144, with a cylindrically-shaped bore 17 which extends in its axial direction and which is sized to slidably receive therein the rotational shaft 13. Accordingly, in order to mount the holder 14 on the motor 12, the rotational shaft 13 of the motor 12 is inserted into the cylindrical bore 17, and an outer peripheral surface of the rotational shaft 13 is fixedly attached with adhesive to an inner wall 17a of the cylindrical bore 17 which extends parallel to the axis of the cylindrical bore.

The mirror assembly 50 having the above-described structure serves to reflect, at the mirror surface 11, the laser beam from the imaging lens 5 and to direct the laser beam toward a series of mirrors 19 which are positioned to guide the laser beam to the slit 22 formed on a bottom plate 200 of the casing 2. Accordingly, the optical scanner 1 operates to output the laser beam through the slit 22 to scan the peripheral surface of the photosensitive drum 3 with the laser beam.

As described above, in the optical scanner 1 of the present invention, the polygon mirror 40 provided in the conventional optical scanner is replaced with the mirror 10 having only the single reflective surface 11. Accordingly, the optical scanner 1 of the present invention obtains the following advantages.

In the already-described conventional optical scanner, the cylindrical lens 36 and the imaging lenses 43 are provided for compensating for precision errors between the different reflective surfaces of the polygonal mirror 40. In the optical scanner of the present invention, the polygonal mirror 40 is replaced with the mirror 10 having only the single reflective surface 11. Accordingly, it becomes possible to eliminate the need for the inclusion of the cylindrical lens 36 and the imaging lenses 43. In addition, the mirror 10 of the present invention which has only the single reflective surface 11 has a lower mass and subsequently a lower inertia in comparison with the polygon mirror 40 employed in the conventional optical scanner. Accordingly, the mirror 10 of the present invention can reduce fluctuations in motor speeds which will be possibly caused when the mirror 10 fails to be attached at its axial gravitational center to the motor 12. Less precision is therefore required when attaching the mirror 10 to the motor 12.

In addition, according to the present invention, the mirror 10 is mounted on the motor 12 via the holder 14, and therefore the following advantages are obtained.

If the mirror 10 are attached directly to the shaft 13 of the motor 12 without using the holder 14, it is necessary to highly accurately position the mirror 10 with respect to the motor 12 before fixing the mirror 10 to the motor 12 so that the reflective surface 11 may extend substantially parallel to the rotational shaft 13 of the motor 12. In case that an angle of the reflective surface 11 with respect to the rotational shaft 13 fails to be greatly shifted from 0 degree but the reflective surface 11 fails to extend in a direction not parallel to the rotational shaft, the laser beam image will erroneously strike the photosensitive drum at an incorrect position. On the other hand, according to the present invention, the angle between the reflective surface 11 and the rotational shaft 13 is defined by an angle formed between the extending direction of the inner surfaces 16a of the support walls 16 and the extending direction of the inner wall 17a of the cylindrical bore 17 (i.e., an axial direction of the cylindrical bore). Since the support walls 16 and the bore 17 are both formed on the holder 14, it is sufficient that the holder 14 would be produced with a precision of such a degree that the angle between the extending directions of the inner surfaces 16a of the support walls 16 and the inner wall 17a of the bore 17 may fall within a desired predetermined angle range. When the mirror 10 is installed in the holder 14 and the holder 14 is mounted to the motor 12, the mirror 10 is pressed against the inner surfaces 16a of the support walls 16 by the ridge portion 15 so that the reflective surface 11 is fixedly attached to the inner surfaces of the support walls 16, and the rotational shaft 13 of the motor 12 is inserted into the bore 17 of the holder 14 and fixedly attached to the inner wall 17a of the bore 17. Accordingly, through simply inserting the mirror 10 into the holder 14 and engaging the rotational shaft 13 in the bore 17 of the holder 14, the angle between the reflective surface 11 and the rotational shaft 13 may automatically fall within the desired predetermined range and the reflective surface 11 may be automatically positioned to extend substantially parallel to the rotational shaft 13 without intricate adjustment operation. Thus, it is possible to easily position the reflective surface 11 with respect to the rotational shaft 13 with a desired precision.

For example, where the distance that the laser beam travels from the mirror 10 to the photosensitive drum 3 (minimum optical path length of the laser beam L which will be described later) is 440 [mm], if the mirror 10 is attached directly to the shaft 13 with deviation in the angle between the reflective surface 11 and the shaft 13 of 5 [mrad], the laser beam will strike the photosensitive drum 3 at a position that deviates from a desired correct position by about 4.4 [mm]. On the other hand, if the mirror 10 is attached to the shaft 13 using the holder 14 produced with deviation in the angle between the inner surfaces 16a of the support walls 16 and the inner wall 17a of the bore 17 of 1 [mrad], without any adjustment the laser beam will strike the photosensitive drum 3 at a position that deviates from the correct position by a maximum of only 0.9 [mm].

The motor 12 includes a DC servo motor which is produced through a well-known technique and which performs excellent constant-speed rotation. The rotation fluctuation of the motor 12 should be determined by the following formula (2):

$$\text{rotation fluctuation} \leq 1/(4R) \times 100 \ (\%) \quad (2),$$

where
R = number of resolution points on a single scan.

For example, in the case where one scan contains 2,500 resolution points (R=2500), the rotation fluctuation needs to be within 0.01% which becomes impossible if the load on the motor 12 (the mirror assembly 50) has a large inertia and the motor is not attached at its axial center of gravity to the shaft 13 of the motor 12.

Also, vibration at the shaft 13 caused by the motor 12 can slightly alter imaging positions between respective scans. If the minimum optical path length (L) from the reflective surface 11 to the photosensitive drum 3 is 440 [mm], suppressing the vibration angle of the shaft 13 to 10 [μrad] may keep the variations of the imaging positions between the respective scans below about 10 [μm].

The type of bearing arrangement to be employed in the motor 12 should be selected dependently on a desired rotation speed of the motor 12. In the case where the rotation speed of equal to or less than 10,000 [rpm] is required, it is preferable to provide the motor with a ball-bearing adjustment. Since the ball-bearing arrangement lacks durability sufficient for rotation speeds of higher than 10,000 [rpm], the rotation speeds of higher than 10,000 [rpm] require a well-known dynamic-pressure type bearing arrangement which has a magnetic bearing installed in the thrust direction and an air bearing in the radial direction. Careful attention should be paid to choose a bearing arrangement that can also allow the rotation shaft vibration angle to have a value which falls in the above-described range, i.e., which is equal to or lower than the value of 10 [μrad]. For example, a ball-bearing arrangement with high-precision balls, a bearing with an elongated axial length, or an air or liquid type bearing may be employed for allowing the rotation shaft vibration to be within the above-described range.

Since the mirror 10 is rotated by the motor 12, the laser beam reflects off the reflective surface to be deflected to sweep in a virtually horizontal direction and at a constant angular velocity. The laser beam is then reflected at respective ones of a series of mirrors 19 so that the laser beam proceeds in a zigzag fashion. The laser beam passes through the slit 22 and sweeps across the peripheral surface of the cylindrical photosensitive drum.

The series of mirrors 19 are formed from flat-surfaced mirrors with no focusing properties. They are produced through aluminum vapor deposition on a glass base as is the mirror 10. The series of mirrors 19 serve to convert a linearly extending optical path of the laser beam into such an optical path as extends in a zigzag manner to thereby elongate the optical path of the laser beam from the mirror 10 to the photosensitive drum 3 while maintaining the direct distance between the mirror 10 and the photosensitive drum 3. According to the present invention, since the optical scanner 1 is thus equipped with the series of the mirrors 19, it is possible to place the optical scanner 1 at a position close to the photosensitive drum 3. In other words, the optical scanner 1 of the present invention thus provided with the series of mirrors 18 enables to decrease the direct distance between the mirror 10 and the photosensitive drum 3 while maintaining the minimum optical path length L from the mirror to the photosensitive drum to be fixed at such a value as required for the imaging lens 5 to focus the laser beam on the photosensitive drum with a desired spot diameter. Accordingly, the optical scanner 1 can decrease the direct distance between the mirror 10 and the photosensitive drum, in comparison with an optical scanner without series of mirrors. In addition, according to the present invention, it is possible to decrease a size of the casing 2. It is noted that since the optical scanner 1 of the present invention is not provided with the fθ lens contrary to the conventional optical scanner, a longer minimum optical path length L from the mirror 10 to the photosensitive drum 3 is required. According to the present invention, however, since the optical scanner 1 is equipped with the series of mirrors 19, it makes possible to reduce the casing size while elongating the minimum optical path length L.

It is further noted that a large direct distance between the mirror 10 and the photosensitive drum 3 erroneously allows the mirror and the photosensitive drum to tend to vibrate independently from each other. In other words, the larger the direct distance between the mirror 10 and the photosensitive drum 3, the larger the relative vibration angle of the mirror 10 with respect to the photosensitive drum 3. The relative vibration of the mirror 10 with respect to the photosensitive drum 3 with a large vibration angle will alter image positions between respective scans by a large distance. Accordingly, the large direct distance between the mirror 10 and the photosensitive drum 3 will sharply affect the image to be formed on the photosensitive drum. According to the present invention, however, the optical scanner 1 is provided with the series of mirrors 19 for setting the minimum optical path length L to a value required for the imaging lens 5 while reducing the direct distance between the mirror 10 and the photosensitive drum 3. Accordingly, the mirror 10 and the photosensitive drum 3 can be vibrated together, and the mirror 10 is rotated with the relative vibration angle with respect to the photosensitive drum 3 having a small value. Thus, it becomes possible to minimize the fluctuations in image positions between respective scans.

A beam detector 20 is further installed in the casing 2 at such a position that it will not block the optical path of the laser beam from the mirror 10 to the photosensitive drum 3, at any segment of the sweep of the laser beam to be scanned on the photosensitive drum. The beam detector 20 includes a photoelectric converter such as a pin photodiode. The beam detector 20 detects the timing when the swept laser beam reaches the position where the beam detector is provided, to obtain an information on sweep timing of the laser beam. The beam detector 20 produces a signal representative of the obtained information on the sweep timing of the laser beam. The beam detector 20 feed-back controls the start timing where the image signal begins to be inputted to the laser source 4 for attaining each scanning sweep. Thus, the laser source 4 can modulate a laser beam in accordance with the image signals at such a timing as is completely synchronized with the sweep timing of the laser beam attained by the mirror assembly 50.

The laser beam reflected from the series of mirror 19 strikes the peripheral surface of the cylindrical photosensitive drum 3 to form a latent image thereon. The latent image is then developed into a visible image thorough a well-known electrophotographic process before being transferred and fixed to a hard copy medium such as paper.

Figure 5:
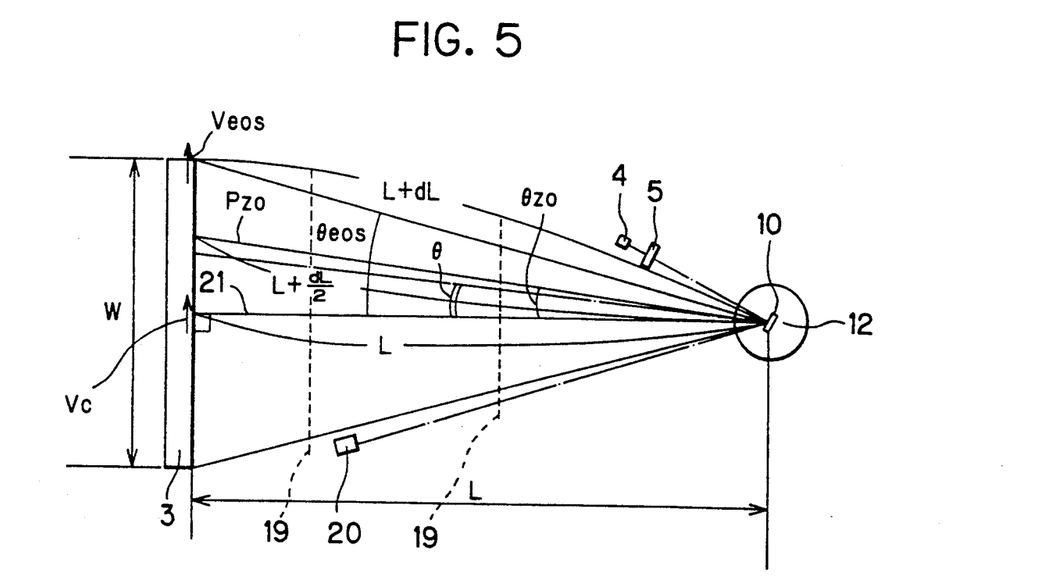
FIG. 5 is a schematic plan view illustrating the state where the optical path of the laser beam is moved for attaining one scan sweep.

FIG. 5 is a plan view schematically showing the state how the optical path of the laser beam is swept with respect to the positions of the laser source 4, the imaging lens 5, the mirror 10, the series of mirrors 19 (in this example, a pair of mirrors 19), the beam detector 20 and the peripheral surface of the cylindrical photosensitive drum 3. To simplify the explanation of the optical path, in the figure, the series of mirrors 19 are indicated by dotted lines and the angles at which the laser beam is reflected at the series of mirrors 19 is assumed to have a value of zero (0) degree.

The length of a single scan where the laser beam can effectively scan the peripheral surface of the photosensitive drum 3 is designated as a scan length W (mm). An imaginary line extending from the mirror 10 perpendicularly to the peripheral surface of the photosensitive drum 3 is designated as a reference line 21. The length of the reference line 21 is designated as the reference line length L which is equal to the above-described minimum optical path length L. The angle between the reference line 21 and the optical path of the laser beam attained at any one time when the laser beam is deflected by the reflective surface 11 which rotates at a fixed angular velocity is designated as the scanning angle θ [rad], where the scanning angle θ has a value within a range of 0 to π/2 (0≦θ≦π/2). The maximum angle between the reference line 21 and the optical path of the swept laser beam which is attained at the time when the laser beam is at the extreme end of a sweep, is designated as the maximum sweep angle θeos which is defined by the following equation (3):

$$\theta eos = \tan^{-1}(W/2L) \quad (3).$$

The difference between the length (L) of the optical path (reference line 21) which is defined by the scanning angle θ of a zero (0) value and the length of the optical path which is defined by the maximum scanning angle θeos is designated as an imaging distance fluctuation dL. The imaging distance fluctuation dL is defined by the following equation (4):

$$dL = L\{1/\cos(\theta eos) - 1\} \quad (4).$$

Figure 6:
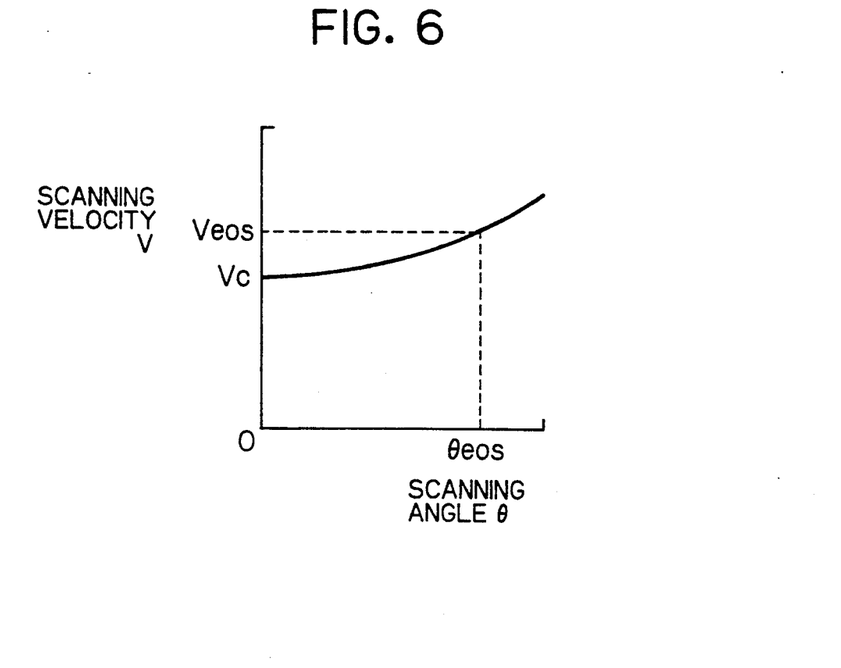
FIG. 6 is a graph representing a relationship between a scanning angle $\theta$ and a scanning velocity V of the beam spot obtained on the surface of the photosensitive drum.

The scan speed obtained over the peripheral surface of the photosensitive drum 3 along the laser beam scanning locus is designated as the scanning velocity V (mm/sec), in the case where the mirror 10 is rotated at a fixed angular velocity by the motor 12. FIG. 6 is a graph representing the relationship between the scanning angle θ of the laser beam and the scanning velocity V. The scanning velocity V can be determined by the following formula (5):

$$V = A \times \cos^{-2}(\theta) \quad (5),$$

where
A is a constant.

As apparent from the formula (5), the scanning speed V gradually increases as the scanning angle θ increases. A rate of the scanning velocity V attained at the end of the scan sweep with respect to the scanning velocity at the center of the scan sweep can be determined by the following equation (6):

$$r = Veos/Vc = \cos^{-2}\{\tan^{-1}(W/2L)\} \quad (6),$$

where
Veos = the scan velocity at the end of a sweep, and
Vc = the scan velocity at the center of a sweep.

The value r will be referred to as a "scan speed fluctuation rate" representing fluctuation degree of the scan speed obtained in a single scan.

As apparent from the above, in the case where the value of the scan length W is set and the desired scan speed fluctuation rate r is selected, the end of sweep scan angle $\theta$eos, the reference line length L, and the imaging distance fluctuation dL can be determined from the equations (3) through (6). As the above formulas show, for the fixed value of the rate of scanning speed fluctuation r, the imaging distance fluctuation dL is proportional to the scan length W.

In the case where the scanning velocity V changes by the fluctuation rate r during a single scan run, if the laser source 4 is controlled to modulate the laser beam in response to the image signals in synchronism with clock signals having a fixed frequency, the photosensitive drum 3 will be sequentially exposed to the imaging laser beam at fixed time intervals. As a result, the distance that the laser beam scans the surface of the photosensitive drum during any fixed time period will vary in accordance with the scanning position. More specifically to say, since the scan velocity at the end of the scan sweep is greater than that at the center of the sweep, the distance scanned during the same fixed period of time will be longer at the end of the scan sweep than at the center of the scan sweep. Now, a scan distance fluctuation rate is defined as a rate of the distance scanned at the end of the scan sweep during a fixed time interval with respect to the distance scanned at the center of the scan sweep also during the same fixed time interval. The scan distance fluctuation rate will therefore be equal to or less than the scan speed fluctuation rate r. Accordingly, in the case where the scan speed fluctuation rate r is set to be in a range from 1.0 to 1.1 ($1.0 \leq r \leq 1.1$), the scan distance fluctuation rate could be made equal to or lower than 1.1. In this way, image distortions can be suppressed even in the case where the photosensitive drum 3 is sequentially exposed to the imaging laser beam at fixed time intervals.

It may be possible to adjust the frequency of the clock signals employed for modulating the laser beam is changed during each scan run so that the frequency may have a high value at the end of the scan sweep and the frequency may have a low value at the center of the scan sweep. In this case, it becomes possible to minimize the image distortion to have a value very close to a value of zero.

Figure 7:
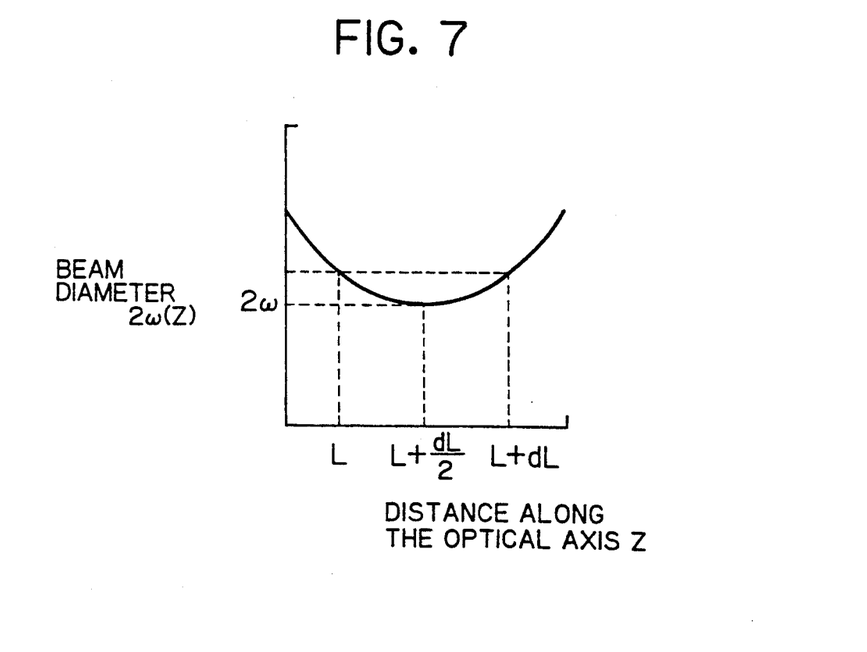
FIG. 7 is a graph representing changes in beam diameter 2ω(z) of a laser beam as the laser beam moves away from a reflective surface of a reflective mirror toward a photosensitive medium.

FIG. 7 is a graph showing how the beam size (beam diameter) of the laser beam changes as the laser beam proceeds along its optical axis (Z axis) away from the source of origin (z=0; the reflective surface 11 in this graph). The beam radius $\omega z$ at any point (z) along the Z axis can be numerically expressed by the following formula (7):

$$\omega(z) = [\omega^2 + \{(z-z_0)\lambda/\omega\pi\}^2]^{\frac{1}{2}} \quad (7)$$

where $\omega(z)$ = a beam radius, z = a distance along the Z axis from the origin, $z_0$ = a distance along the Z axis from the origin to a position where the laser beam obtains the diameter of the smallest value of $2\omega$, and $\omega$ = the smallest beam radius obtained by the laser beam.

As apparent from the graph of FIG. 7, in order to minimize difference between the value of the beam radius $\omega(z)$ (where z=L) attained by the laser beam which has proceeded along the optical path having the scanning angle $\theta$ of zero (0) to reach the photosensitive drum 3 and the value of the beam radius $\omega(z)$ (where z=L+dL) attained by the laser beam which has proceeded along the optical path having the end of sweep scan angle $\theta$eos to reach the photosensitive drum 3, the length ($z_0$) of the optical path between the source origin (z=0) and the position (z=$z_0$) where the laser beam attains the smallest beam diameter $2\omega$ should be selected to have a value determined by the following equation (8), $$z = L + dL/2 \quad (8).$$

Accordingly, changes in the beam radius $\omega(z)$ obtained on the surface of the photosensitive drum 3 along the scan length W can be minimized, in the case where the laser unit 6 is adjusted to set the distance between the laser source 4 and the imaging lens 5 to such a value that the length $z_0$ may be adjusted to have the value of z=L+dL/2.

More specifically to say, it is noted that in the case where the optical path of the laser beam coincides with the reference line 21, i.e., in the case where the scanning angle $\theta$ is 0, the laser beam strikes the photosensitive drum with a beam diameter $2\omega(z)$ calculated by the formula (7) where z=L. On the other hand, in the case where scan is at the end of sweep, i.e., in the case where the scanning angle $\theta$ has the value of the scanning angle $\theta$eos, the laser beam strikes the photosensitive drum 3 with a beam diameter $2\omega(z)$ calculated by the formula (7) where z=L+dL. In the case where the laser beam proceeds along an optical path $P_{z0}$ which is defined as a scanning angle $\theta_{z0}$ as shown in FIG. 5 and which has the optical path length of L+dL/2, the laser beam can strike the photosensitive drum 3 with a beam diameter $2\omega$ which is calculated by the formula (7) where $z=z_0=L+dL/2$.

To summarize, in the case where the laser unit 6 is adjusted to set the distance between the laser source 4 and the imaging lens 5 to such a value that the laser beam having proceeded along the optical path $P_{z0}$ may focus the beam spot having the smallest diameter of $2\omega$ on the photosensitive drum, the fluctuation in the beam diameter occurred during a scan run along the scan length W can be minimized.

Here, a fluctuation rate of the beam diameter s during a scan run is defined as a ratio of values of the maximum diameter $2\omega(z)$ obtained on the photosensitive drum with respect to the minimum diameter $2\omega$ obtained on the photosensitive drum. The fluctuation value s is therefore determined dependently on the value of the image distance fluctuation dL where the minimum diameter $2\omega$ is fixed.

The following is an example in concrete terms. In the case where the scan length W is 220 [mm], the minimum diameter beam $2\omega$ is 100 [μm], if the scan speed fluctuation rate r is 1.06, the scan angle at the end of a scan sweep $\theta$eos will be 0.24 [rad] and the reference line length L will be 443 [mm]. Under these circumstances, the image distance fluctuation dL is 13 [mm] and therefore the beam diameter fluctuation s is 1.2. In other words, during one scan sweep, the minimum beam diameter will be about 100 [μm] and the maximum beam diameter will be about 120 [μm].

Figure 8:
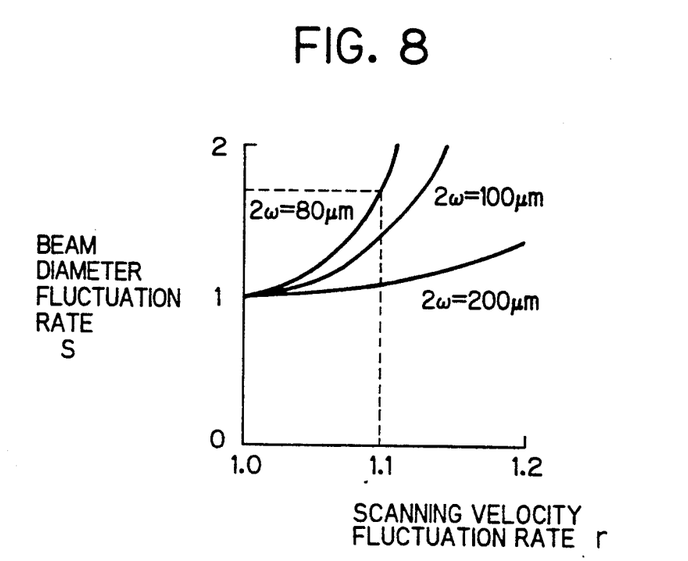
FIG. 8 is a graph representing a relationship between a fluctuation rate r in the scanning velocity V and a beam diameter fluctuation rate s where a scan length W is fixed at 220 [mm] while a minimum beam diameter 2ω is selected to have several values to produce several curved lines corresponding to the several values of the minimum beam diameter 2ω.
Figure 9:
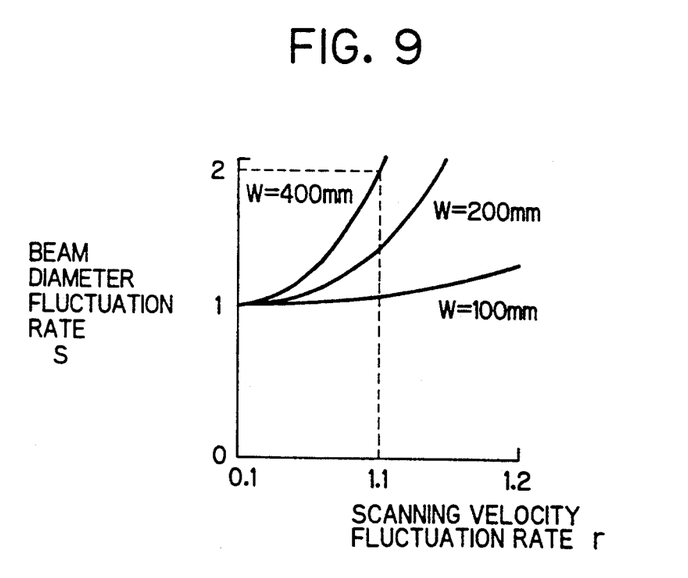
FIG. 9 is a graph representing a relationship between the fluctuation rate r in the scanning velocity V and the beam diameter fluctuation rate s where the minimum beam diameter 2ω is fixed at 100 [μm] while the scan length W is selected to have several values, to produce several curved lines corresponding to the several values of the scan length W.

FIGS. 8 and 9 are graphs representing the relationship between the scan speed fluctuation rate r and the beam diameter fluctuation rate s. The points on the graphs are calculated by the above-mentioned formulas. In FIG. 8, a value of the minimum beam diameter $2\omega$ is selected to have various values (80 [μm], 100 [μm] and 200 [μm]) while maintaining a value of the scan length W to be fixed at 220 [mm], so that several curved lines corresponding to the selected values of the minimum beam diameter 2ω are shown. Similarly in FIG. 9, the value of the scan length W is selected to have several values (100 [mm], 200 [mm] and 400 [mm]) while maintaining the value of the minimum diameter beam 2ω to be fixed at 100 [μm], so that a plurality of curved lines corresponding to the selected values of the scan length W are shown.

FIG. 8 shows that if the scan speed fluctuation rate r falls within a range from 1.0 to 1.1 ($1.0 \leq r \leq 1.1$), and if the minimum beam diameter 2ω is greater than or equal to 80 [μm] ($2\omega \geq 80$ [μm]), the beam diameter fluctuation rate s may become less than or equal to 2.0 ($s \leq 2.0$).

FIG. 9 shows that if the scan speed fluctuation rate r falls within a range from 1.0 to 1.1 ($1.0 \leq r \leq 1.1$), and if the scan length W is less than or equal to 400 [mm] ($W \leq 400$ [mm]), the beam diameter fluctuation rate s may become less than or equal to 2.0 ($s \leq 2.0$).

Thus, by maintaining a scan speed fluctuation rate r within a range from 1.0 to 1.1 ($1.0 \leq r \leq 1.1$), the beam diameter fluctuations on the surface of the photosensitive drum 3 can be kept low. It is noted that suppressing the beam diameter fluctuation rate s to less than or equal to 2.0 ($s \leq 2.0$) is necessary for preventing image formation problems such as variations in line width because of large beam diameter fluctuations, variations in the size or thickness or density of one-dot images, and declines in resolution.

The optical scanner 1 having the above-described structure operates, as will be described below.

The light source 4 receives image signals and flashes a laser beam in response to the image signals. The laser beam passes through the image lens 5 where it is sufficiently focused for producing an image beam spot on the surface of the photosensitive drum 3. Upon emerging from the image lens 5, the laser beam moves toward the mirror 10. The mirror 10 is centrally mounted on the rotating shaft 13 of the motor 12, so that the mirror 10 rotates at the high constant speed. The laser beam strikes and reflects off the highly reflective surface 11 of the mirror 10. In the case where the laser beam strikes any other part of the mirror assembly 50, on the other hand, the light is absorbed or scattered by the light-absorbing or light-scattering surface 18, thereby preventing undesired images from appearing on the photosensitive drum 3 that might otherwise appear if light reflected off the parts of the mirror assembly 50 other than the reflective surface 11 reaches the photosensitive drum.

The rotation of the mirror 11 causes the laser beam to be deflected in a virtual horizontal sweep at a constant angular velocity. The laser beam then reflects off a series of mirrors 19 fixed at angles appropriate for directing the laser beam through the slit 22 of the optical scanner 1 toward the photosensitive drum 3. The laser beam sequentially strikes the photosensitive drum 3 where a latent image corresponding to the image signals is produced. The latent image is then developed into a visible image to be transferred and fixed onto a hard copy medium such as paper.

While the invention has been described in detail with reference to a specific embodiment thereof, it would be apparent to those skilled in the art that various changes and modifications may be made therein without departing from the spirit of the invention.

For example, the light-absorbing or light-scattering surface can be formed directly on surfaces of the mirror 10 other than the reflective surface 11. If the mirror 10 is formed of glass, surfaces other than the reflective surface 11 can be roughened by grinding. Surfaces of the mirror 10 other than the reflective surface 11 can also be coated with colored ink, colored tape or other thick colored material. In these cases, the light-absorbing or light-scattering surface 18 need not be formed on the holder 14.

The mirror 10 can be attached directly to the rotating shaft 13 without the use of the holder 14. This can be accomplished by fixedly attaching the mirror 10 with adhesive on the rotating shaft 13. Furthermore, the mirror 10 may be formed with a cylindrical bore at the bottom side thereof for receiving the rotating shaft, the cylindrical bore having a longitudinal axis extending in a direction which forms a desired angle with respect to the reflective surface 11. In the case where the mirror 10 is directly attached to the rotating shaft 13, the light-absorbing or light-scattering surface 18 is still necessarily provided on the mirror 10. Forming the light-absorbing or light-scattering surface 18 directly to the mirror 10 allows simplification of or elimination of the holder 14.

The mirror 10 may be formed by grinding and polishing a surface of a plate formed of aluminum or other metal. It is noted that in order to load the motor 12 with the mirror 10 in a balanced manner, the mirror 10 should be symmetrically shaped with respect to the rotating shaft 13, in order to prevent the rotation speed of the motor 12 from erroneously fluctuating to create distortions in the image.

The series of mirrors 19 can be of any number and can be freely positioned. Furthermore, the series of mirrors 19 can be eliminated totally. Elimination of the series of mirrors 19 further simplifies the optical scanner of the present invention. The series of mirrors 19 can include at least one pair of mirrors positioned to reflect light a number of times therebetween to perform a multiple reflection. The pair of mirrors thus performing the multiple reflection may further elongate the length L of the optical path of the laser beam from the mirror 10 to the photosensitive drum. Accordingly, with the use of the multiple reflection performing mirrors, it is possible to further reduce the direct distance between the mirror 10 and the photosensitive drum 3.

As described above, in the optical scanning apparatus of the present invention, the mirror is only single-surface and the optical imaging system for optically converting the light beam emitted from the light source into a focused imaging beam is located at only one position between the light source and the mirror. Accordingly, the optical scanning apparatus of the present invention has a simpler structure than the conventional optical scanner. In other words, components employed in the optical scanning apparatus of the present invention have simpler structures and the number thereof can be reduced, in comparison with the conventional optical scanner.

The single-surfaced mirror employed in the present invention eliminates the problem in the conventional optical scanner that angles between surfaces of polygonal mirrors differ. Accordingly, it becomes unnecessary to provide the optical scanning apparatus with the optical systems for correcting these differences. Furthermore, the lower mass, and subsequently the lower inertia, of the single-surfaced mirror requires less adjustment equipment than is required for polygonal mirrors.

The above points reduces production costs of the optical scanner.

What is claimed is:

1. An optical scanning apparatus for optically scanning a medium, comprising:
   a light source for receiving image information and for emitting a light beam modulated in accordance with the image information;
   reflecting means including a first part defining a single reflective surface for reflecting the light beam emitted from said light source to direct the light beam to the medium, the reflecting means further including a second part;
   rotating means for rotating the single reflective surface of said reflecting means to allow the single reflective surface to scan the light beam on the medium in a scanning sweep;
   imaging means for receiving the light beam emitted from said light source and for converting the light beam into a focused light beam to be focused on the medium, the single reflective surface of said reflecting means receiving the focused light beam from said imaging means and directing the focused light beam to the medium; and
   preventing means for preventing the second part of said reflecting means for directing the light beam to be focused on the medium.

2. The optical scanning apparatus of claim 1, wherein said reflective means includes a plate-shaped reflective mirror having the single reflective surface for reflecting the light beam to direct it to the medium, the surface being flat.

3. The optical scanning apparatus of claim 1, wherein said preventing means includes means for allowing the second part of said reflecting means to absorb the light beam.

4. The optical scanning apparatus of claim 1, wherein said preventing means includes means for allowing the second part of said reflecting means to scatter the light beam.

5. The optical scanning apparatus of claim 1, wherein said rotating means includes a rotating shaft which rotates around an axis thereof, and further comprising fixing means for fixing said reflecting means to the rotating shaft so as to form an angle between the single reflective surface and the rotating shaft, the angle having a value falling within a desired range; holding therein said reflecting means, the holding member having a first area for exposing at least a part of the single reflective surface of said reflecting means and a second area, and wherein said preventing means includes prevention means for allowing the second area of the holding member to prevent the second part of said reflecting means from directing the light beam to be focused on the medium.

6. The optical scanning apparatus of claim 5, wherein said fixing means is formed with first and second contacting surfaces for contacting the single reflective surface and the rotating shaft, respectively, in the case where said fixing means fixes said reflecting means to the rotating shaft, the first and second contacting surfaces extend in directions which form therebetween the angle which has the value within the desired range.

7. The optical scanning apparatus of claim 6, wherein said reflecting means includes a reflective mirror having the single reflective surface, and wherein said fixing means includes a holder for fixedly holding therein both the reflective mirror and the rotating shaft of said rotating means, the holder having a mirror supporting wall defining the first contacting surface and pressing means for pressing the mirror against the mirror supporting wall so that the single reflective surface of the mirror may be in contact with the first contacting surface, the mirror supporting wall having at least one edge for defining an exposing area for exposing at least a part of the single reflective surface of the reflective mirror, the holder further having an inner peripheral wall defining the second contacting surface and defining a cylindrical bore for receiving the rotating shaft inserted therein so that the rotating shaft may be in contact with the second contacting surface.

8. The optical scanning apparatus of claim 5, wherein said fixing means includes a holding member for holding therein said reflecting means, the holding member having a first area for exposing at least a part of the single reflective surface of said reflecting means and a second area, and wherein said preventing means includes prevention means for allowing the second area of the holding member to prevent the second part of said reflecting means from directing the light beam to be focused on the medium.

9. The optical scanning apparatus of claim 8, wherein said prevention mens includes means for allowing the second area of the holding member to prevent the second part of said reflecting means from being exposed, the second area of the holding member absorbing the light beam received thereon to prevent the received light beam from being focused on the medium.

10. The optical scanning apparatus of claim 9, wherein the second area of the holding member is formed of light-absorbing material for absorbing the light beam.

11. The optical scanning apparatus of claim 9, wherein an outer surface of the second area of the holding member is coated with light-absorbing material for absorbing the light beam.

12. The optical scanning apparatus of claim 8, wherein said prevention means includes means for allowing the second area of the holding member to prevent the second part of said reflecting means from being exposed, the second area of the holding member scattering the light beam received thereon to prevent the received light beam from being focused on the medium.

13. The optical scanning apparatus of claim 12, wherein the second area of the holding member is formed of light-scattering material for scattering the light beam.

14. The optical scanning apparatus of claim 12, wherein an outer surface of the second area of the holding member is roughened to scatter the light beam.

15. The optical scanning apparatus of claim 1, wherein a length W (mm) of a scan locus on the medium effectively scanned by the light beam reflected from the single reflective surface of said reflecting means in one scanning sweep and a smallest length L (mm) of an optical path along which the light beam travels from the single reflective surface of said reflecting means to the medium satisfies the following relationship:

$$1.0 \leq \cos^{-2}\{\tan^{-1}(W/2L)\} \leq 1.1.$$

16. The optical scanning apparatus of claim 1, further comprising an optical path elongating means for receiving the light beam reflected from the single reflective surface of said reflecting means and for directing the light beam to the medium, said optical path elongating means elongating a smallest length L (mm) of an optical path along which the light beam travels from the single reflective surface to the medium while maintaining a direct distance between the single reflective surface and the medium.

17. The optical scanning apparatus of claim 16, wherein said optical path elongating means includes at least one reflective mirror.

18. An optical scanning apparatus for optically scanning a medium, comprising:
 a light source for receiving image information and for emitting a light beam modulated in accordance with the image information;
 reflecting means formed with a single reflective surface for reflecting the light beam from said light source to direct the light beam to the medium;
 an optically imaging system positioned in a single location between said light source and said reflecting means along an optical path of the light beam, said optically imaging system receiving the light beam from said light source, converting the light beam into a focused beam to be focused on the medium, and directing the focused light beam to said reflecting means;
 rotating means for rotating said reflecting means to allow the reflective surface to scan the light beam on the medium in a scanning sweep; and
 preventing means for preventing surfaces other than the reflective surface of said reflecting means from directing the light beam to be focused on the medium.

19. The optical scanning apparatus of claim 18, wherein said preventing means includes means for absorbing the light beam received on the surfaces of said reflecting means other, than the reflective surface.

20. The optical scanning apparatus of claim 18, wherein said preventing means includes means for scattering the light beam received on the surfaces of said reflecting means other than the reflective surface.

21. The optical scanning apparatus of claim 18, wherein said rotating means includes a rotating shaft for rotating about an axis at a fixed speed, and further comprising fixing means for axially fixing the single reflective surface of said reflecting means to the rotating shaft.

22. The optical scanning apparatus of claim 21, wherein said reflecting means includes a plate-shaped reflective mirror having the single flat reflective surface, wherein the surface is flat and said fixing means includes a holder for holding therein the plate-shaped mirror, the holder having a first area for exposing at least one part of the reflective surface of the plate-shaped mirror and a second area, and wherein said preventing means includes means for allowing the second area of the holder to prevent the light beam received thereon from being directed to the medium to be focused thereon.

23. The optical scanning apparatus of claim 22, wherein said preventing means includes means for absorbing the light beam received on the second area of the holder.

24. The optical scanning apparatus of claim 22, wherein said preventing means includes means for scattering the light beam received on the second area of the holder.

* * * * *